United States Patent [19]
Moore et al.

[11] 4,172,573
[45] Oct. 30, 1979

[54] FUEL TANK

[75] Inventors: Wesley D. Moore, Palos Verdes Estates; Silveus M. Baker, Tustin, both of Calif.

[73] Assignee: Royal Industries, Inc., Pasadena, Calif.

[21] Appl. No.: 863,594

[22] Filed: Dec. 22, 1977

[51] Int. Cl.² .............. B64D 37/08; B65D 25/04; B65D 25/18

[52] U.S. Cl. .............. 244/135 R; 220/89 A; 220/435; 220/469; 220/900

[58] Field of Search ............ 244/135 R, 135 C, 135 B; 220/85 B, 900, 442, 440, 435, 89 A, 469; 52/573; 137/68 R, 67; 138/30

[56] References Cited
U.S. PATENT DOCUMENTS

| 1,003,796 | 9/1911 | Ragot | 244/135 C |
| 2,387,353 | 10/1945 | Raymond | 137/68 R X |
| 2,403,749 | 7/1946 | O'Neal | 244/135 R |
| 2,430,905 | 11/1947 | Bradley | 220/85 B X |
| 2,514,888 | 7/1950 | McFarland | 244/135 R |
| 2,611,512 | 9/1952 | Fashay | 220/436 X |
| 2,621,719 | 12/1952 | Eaton et al. | 244/135 B |
| 2,623,721 | 12/1952 | Harrington | 244/135 R |
| 3,506,224 | 4/1970 | Harr et al. | 220/900 X |
| 3,779,420 | 12/1973 | Knaus | 220/85 B X |

Primary Examiner—Allan N. Shoap
Attorney, Agent, or Firm—Edward J. DaRin

[57] ABSTRACT

An external, aircraft fuel tank constructed to be crashworthy or to withstand a crash from flight without rupturing the outer, rigid walls thereof. The fuel tank includes bulkheads arranged in the tank adjacent to but spaced from the end sections and defined to be yieldably responsive to fluid pressures above normal operating pressures for dissipating the kinetic energy of the fluid without rupturing the outer, rigid walls of the tank.

4 Claims, 5 Drawing Figures

PRIOR ART FUEL TANK
(FIG'S. 1-3)

FUEL TANK

Prior Art and Summary of the Invention

This invention relates to external, aircraft fuel tanks and more particularly to a crashworthy fuel tank. External, aircraft fuel tanks are generally mounted below the wing or fuselage. Fuel tanks have been conventionally constructed of metal or some other rigid material since they must withstand aerodynamic loads. External, aircraft fuel tanks generally have a smooth aerodynamic shape for minimizing drag in flight. A typical fuel tank of this type is disclosed in U.S. Pat. No. 2,678,750.

At the present time there is a need for aircraft fuel tanks to withstand the deceleration of a crash without rupturing the fuel containing boundary of the tank. The rupture of a tank in a crash that would otherwise not be fatal to the occupants releases fuel which becomes an immediate fire hazard, which is usually fatal. This problem has been solved for internal fuel tanks by use of flexible, non-metallic tanks which prevent extremely high pressure during the crash because of their flexibility. This solution is not possible for external, aircraft fuel tanks, since they must be rigid to withstand aerodynamic loads.

The present invention provides an improved crashworthy, external, aircraft fuel tank uniquely adapted to withstand the deceleration of a crash without rupturing the fuel containing boundary of the tank.

These and other features of the present invention may be more fully appreciated when considered in the light of the following specification and drawings, in which.

Figure 1:
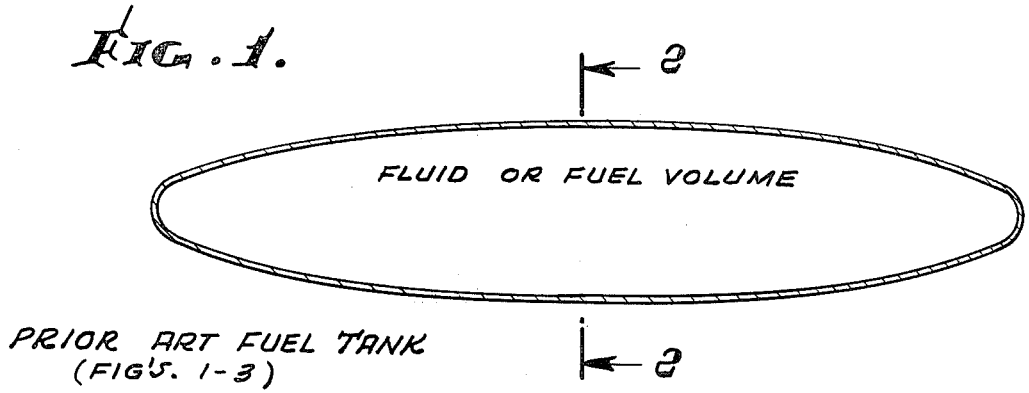
FIG. 1 is a diagrammatic representation of a typical prior art type fuel tank illustrating the aerodynamic shape thereof.
Figure 2:
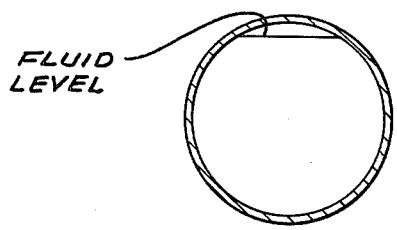
FIG. 2 is an illustration of the cross-section taken along the line 2—2 of the filled tank of FIG. 1.
Figure 3:
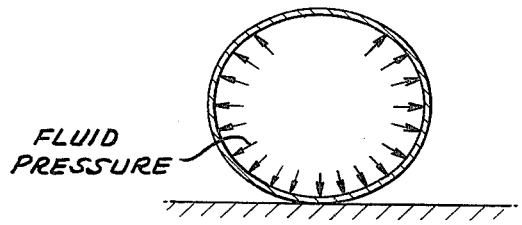
FIG. 3 is an illustration of the resulting cross-section of the tank of FIG. 2 during a crash of the aerodynamic vehicle and diagrammatically illustrating the fluid pressure on the walls of the tank.

Now referring to the drawings, the invention of the crashworthy fuel tank 10 of the present invention will be described in detail. Initially, to better understand the concept of the present invention, the problem of the rupturing of the prior art fuel tank will be briefly examined in conjunction with FIGS. 1-3. The prior art fuel tank illustrated in FIG. 1 has a generally symmetrical outer configuration relative to its longitudinal axis with a generally circular cross-section between its end sections. The end sections are constructed and defined to have an aerodynamic outer contour whereby a hollow, closed fuel storage compartment is defined by the metallic walls of the tank. The tank is constructed and defined to be sufficiently rigid for withstanding the normal aerodynamic loads that the tank is subjected to when mounted to the wing of the aircraft, or a similar aerodynamic vehicle, when in flight. FIG. 2 is a diagrammatic representation of the normal cross section of the fuel tank with the fuel stored therein so as to occupy substantially all of the volume therein. The diagrammatic illustration of FIG. 3 illustrates the cross-section of the same prior art tank as in FIG. 2, but during a crash. During the deceleration of the aircraft during a crash, the fluid pressure of the fluid stored in the tank rises to a high value because the structure of the tank has a high rigidity and is therefore not capable of dissipating much energy by straining the walls of the tank. The rise of the fluid pressure of the fluid stored in a full tank is further accentuated because the volume of the tank structure decreases as the structure deflects from its normal cross section upon impacting the ground, as illustrated in FIG. 3. This may result in the tank rupturing during the deceleration of a crash of the aircraft thereby releasing fuel leading to an immediate fire hazard.

Figure 4:
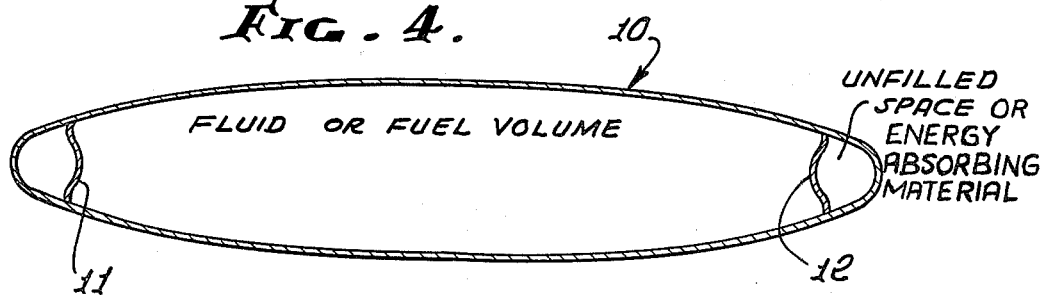
FIG. 4 is a diagrammatic representation of the crashworthy fuel tank in accordance with the present invention.

Now referring to FIG. 4, the tank 10 constructed in accordance with the present invention can be better appreciated. The tank 10 is illustrated as having the conventional construction of the type of tank 10 illustrated in FIG. 1. The tank 10, however, in accordance with the present invention, includes bulkhead means constructed within the fuel storage volume adjacent each end section. The forward or left-hand bulkhead means as illustrated in FIG. 4 is identified by the reference numeral 11, while the aft or right-hand bulkhead means is identified by the reference numeral 12. Each of the bulkheads are arranged adjacent the fore and aft aerodynamically shaped sections of the tank 10 and are spaced inwardly thereof a preselected distance for terminating the fuel storage volume of the tank. The bulkhead means 11 and 12 are constructed and defined for withstanding the normal operating pressures to which the tank is subjected without yielding but yet is advantageously defined to be yieldable to operating pressures above the normal operating pressures that the tank is subjected to, to thereby dissipate some of the kinetic energy of the fluid stored in the tank. The bulkheads 11 and 12 are illustrated in FIG. 4 in their normal, non-yielding or fixed position. The provision of the yieldable bulkhead means 11 and 12 for the tank 10 causes some of the kinetic energy in the fluid stored in the tank 10 to be dissipated in moving the bulkheads towards their adjacent end sections whereby the fluid pressure of the stored fluid is prevented from rising to a value that would cause failure of the fluid storage means during the time intervals that the tank is subjected to above normal operating pressures.

Figure 5:
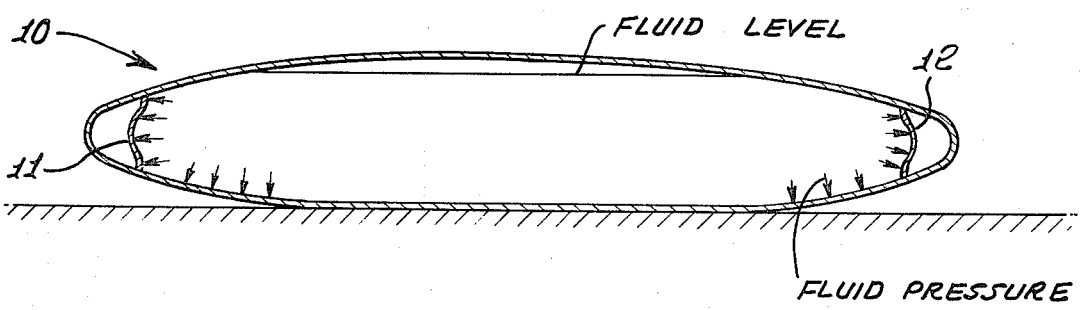
FIG. 5 is a diagrammatic illustration of the filled tank of FIG. 4 illustrating the resulting configuration during a crash and diagrammatically illustrating the fluid pressure on the walls thereof.

The configuration of the tank 10 during a crash is illustrated in FIG. 5. It should be noted that the bulkhead means 11 and 12 are illustrated in FIG. 5 in the yielded configuration that they have assumed in response to the internal pressures generated by the fuel stored in tank 10 during crash conditions. It will be noted that in its normal fuel storage position, the bulkhead means 11 and 12 assume a substantial concave configuration relative to the adjacent nose sections of the tank 10. As a result of the deforming or yielding of the bulkhead means 11 and 12, some of the kinetic energy in the fuel at the time of contact of the tank 10 with the ground is dissipated by the elastic and plastic deformation of the bulkheads 11 and 12. Dissipation of or absorption of the kinetic energy prevents the fluid pressure of the stored fuel from rising to a value that would cause failure of the fluid boundary or walls of the tank as would occur in prior art structures.

It will be recognized by those skilled in the art that the bulkhead means may comprise a frangible member that ruptures at pressures above the normal operating pressures of the tank 10. In this latter embodiment the increased fluid pressure is dissipated by the flow of the fluid and the drop in pressure of the fluid as a result of the fluid moving through the rupture in the bulkhead means. Of course, it will be appreciated that the combination of the two aforementioned embodiments may also be provided. Specifically, the bulkhead means 11 and 12 may have elastic and plastic deformation characteristics and rupture at a preselected pressure above the normal operating pressure after having been deformed a preselected amount.

Another embodiment of the concept of the present invention takes into consideration the space between the end sections of the tank 10 and the bulkhead means 11 and 12. These spaces may be occupied solely by air or may be filled with an energy absorbing material which may consist of rubber, plastic foam or similar resilient materials.

What is claimed is:

1. A crashworthy, external aircraft fluid storage means comprising a fuel tank having a generally symmetrical outer configuration relative to its longitudinal axis with a generally circular cross-section between the end sections and with the end sections having an aerodynamic outer contour for defining a hollow, closed fuel storage compartment, said fuel tank is constructed and defined with walls that are sufficiently rigid and define structural means for withstanding the normal aerodynamic loads that it is subject to including when storing a fluid and when mounted to and external to the wing of an aircraft when the aircraft is in flight and for withstanding the decelerating forces created during the crash of the aircraft but not capable of dissipating large amounts of energy of any fluid stored therein by straining the walls of the fuel tank, and bulkhead means having preselected elastic and plastic deformation characteristics for dissipating energy, said bulkhead means constructed within the fluid tank and comprising a bulkhead adjacent each end section having the aerodynamic outer contour, each bulkhead spaced a preselected distance inwardly of the end sections and being secured to the walls thereof for terminating the fuel storage volume and physically defined to be in a fixed, non-yielding position for withstanding the normal operating pressures the fuel tank and the fluid stored therein are subjected to without yielding its position but yet physically defined to be readily deformed towards the adjacent end sections at a preselected first pressure above normal operating pressure and below the rupture pressure of the walls of the fuel tank to increase the fuel storage volume to an extent to cause some of the kinetic energy of the fluid stored in the thus-defined fuel tank to be dissipated by means of the elastic and plastic deformation of the bulkhead means, said deformation of said bulkhead means preventing the fluid pressure of the stored fluid from rising to a value that would cause failure of the rigid walls of the fuel tank during the time intervals that the fuel tank is subjected to above normal operating pressures instantaneously created when an aircraft crashes; said bulkhead means constructed to have a preselected concave configuration relative to the end sections with a concavity extending into the fluid storage volume and yieldable to move toward said sections to assume a convex configuration relative to the fluid storage volume for increasing the volume to an extent for dissipating the energy of the stored fluid at said preselected first pressure below the rupture pressure of the fuel tank.

2. A crashworthy, external, aircraft fuel tank as defined in claim 1 wherein said bulkhead means is further constructed to be ruptured at a preselected second pressure above normal operating pressure but below the operating pressure that would normally cause failure of the fuel tank whereby any stored fluid may flow through the ruptured bulkhead means.

3. A crashworthy, external, aircraft fuel tank as defined in claim 1 wherein the volume between said bulkhead means and each end section of said fluid storage means is occupied by air.

4. A crashworthy, external, aircraft fuel tank as defined in claim 1 wherein the volume between said bulkhead means and each end section of said fluid storage means is occupied by an energy absorbing material.

* * * * *